(12) United States Patent
Smith

(10) Patent No.: US 11,143,051 B2
(45) Date of Patent: Oct. 12, 2021

(54) TRANSLATING COMPRESSOR AND TURBINE ROTORS FOR CLEARANCE CONTROL

(71) Applicant: UNITED TECHNOLOGIES CORPORATION, Hartford, CT (US)

(72) Inventor: Darren M. Smith, Andover, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1459 days.

(21) Appl. No.: 14/917,293

(22) PCT Filed: Sep. 12, 2014

(86) PCT No.: PCT/US2014/055336
§ 371 (c)(1),
(2) Date: Mar. 8, 2016

(87) PCT Pub. No.: WO2015/065597
PCT Pub. Date: May 7, 2015

(65) Prior Publication Data
US 2016/0215647 A1   Jul. 28, 2016

Related U.S. Application Data

(60) Provisional application No. 61/885,583, filed on Oct. 2, 2013.

(51) Int. Cl.
*F01D 11/22* (2006.01)
*F01D 17/20* (2006.01)
(Continued)

(52) U.S. Cl.
CPC .............. *F01D 11/22* (2013.01); *F01D 17/02* (2013.01); *F01D 17/20* (2013.01); *F02C 7/36* (2013.01)

(58) Field of Classification Search
CPC .......... F01D 11/14; F01D 11/16; F01D 11/20; F01D 11/22; F01D 17/02; F01D 17/20;
(Continued)

(56) References Cited

U.S. PATENT DOCUMENTS 2,762,559 A * 9/1956 Faught ...................... F01D 5/06
415/17
4,149,826 A * 4/1979 Torstenfelt .............. F01D 25/24
415/127

(Continued)

OTHER PUBLICATIONS

International Search Report from corresponding PCT/US14/55336.
(Continued)

*Primary Examiner* — David Hamaoui
*Assistant Examiner* — Wayne A Lambert
(74) *Attorney, Agent, or Firm* — Carlson, Gaskey & Olds, P.C.

(57) ABSTRACT

A first actuator moves a compressor rotor and compressor blades along a rotational axis of the compressor rotor. A turbine rotor includes a plurality of turbine blades each extending radially outwardly from the turbine rotor to an outer tip. A turbine housing surrounds each of the turbine blade tips. The turbine housing has an inner surface, and a turbine tip clearance is defined between each of the turbine blade tips and the inner surface of the turbine housing. A second actuator moves the turbine rotor and the turbine blades along a rotational axis of the turbine rotor. A control controls the first actuator of the compressor rotor, and the second actuator of the turbine rotor to control the compressor tip clearance and the turbine tip clearance.

7 Claims, 2 Drawing Sheets

(51) Int. Cl.
*F01D 17/02* (2006.01)
*F02C 7/36* (2006.01)

(58) Field of Classification Search
CPC .... F01D 26/16; F04D 15/0072; F04D 29/042; F02C 7/36
See application file for complete search history.

(56) References Cited

U.S. PATENT DOCUMENTS

| | | | | |
|---|---|---|---|---|
| 5,051,061 A | * | 9/1991 | Meylan | F01D 25/162 248/901 |
| 5,056,986 A | * | 10/1991 | Silvestri, Jr. | F01D 5/225 324/207.24 |
| 5,203,673 A | * | 4/1993 | Evans | F01D 11/22 415/10 |
| 5,330,320 A | * | 7/1994 | Mansson | F01D 11/22 415/129 |
| 5,533,825 A | * | 7/1996 | Stone | F01D 5/026 403/359.6 |
| 6,092,986 A | * | 7/2000 | Oeynhausen | F01D 25/24 415/104 |
| 7,407,369 B2 | * | 8/2008 | Schwarz | F01D 11/122 415/127 |
| 7,652,489 B2 | * | 1/2010 | Dasgupta | F01D 11/20 324/662 |
| 7,909,566 B1 | | 3/2011 | Brostmeyer | |
| 8,011,883 B2 | * | 9/2011 | Schwarz | F01D 11/20 415/127 |
| 8,769,816 B2 | * | 7/2014 | Beeck | F01D 11/00 29/889.2 |
| 9,243,499 B2 | | 1/2016 | Braun et al. | |
| 2002/0009361 A1 | | 1/2002 | Reichert et al. | |
| 2003/0215323 A1 | * | 11/2003 | Prinz | F01D 5/048 415/14 |
| 2006/0140755 A1 | | 6/2006 | Schwarz et al. | |
| 2008/0131270 A1 | * | 6/2008 | Paprotna | F01D 11/20 415/173.2 |
| 2008/0247865 A1 | | 10/2008 | Fiala et al. | |
| 2011/0229301 A1 | * | 9/2011 | Miller | F01D 11/22 415/1 |
| 2012/0192570 A1 | * | 8/2012 | McCune | F01D 25/18 60/792 |
| 2013/0129478 A1 | * | 5/2013 | Braun | F01D 5/026 415/60 |
| 2013/0156578 A1 | | 6/2013 | Little et al. | |
| 2013/0323047 A1 | * | 12/2013 | Van Duyn | F01D 25/16 415/229 |

OTHER PUBLICATIONS

Supplementary European Search Report for European Application No. 14856933.8 dated Oct. 11, 2016.
International Preliminary Report on Patentability for International Application No. PCT/US2014/055336 dated Apr. 14, 2016.

* cited by examiner

TRANSLATING COMPRESSOR AND TURBINE ROTORS FOR CLEARANCE CONTROL

CROSS-REFERENCE TO RELATED APPLICATION

This application claims priority to U.S. Provisional Application No. 61/885,583, filed Oct. 2, 2013.

BACKGROUND

This application relates to a combined turbine and compressor rotor, which rotate with a common shaft, but which can each be moved axially to control clearance.

Gas turbine engines are known and, typically, include a fan delivering air into a compressor. The air is compressed in the compressor and delivered into a combustor. The air is mixed with fuel and ignited. Products of the combustion pass downstream over turbine rotors driving them to rotate.

The compressor and turbine rotors typically include blades which have an outer tip which is spaced from an inner surface of an outer housing. As the air moves downstream along a compressor rotor, the outer housing and the compressor blade tips tend to decrease in volume and are generally conical. A turbine rotor expands in a downstream direction in an opposite manner to that to the compressor rotor.

In both the compressor and turbine, a distance between the outer tip of the blades and an inner surface of the housing could be called a "tip clearance." The tip clearance can vary during engine operation. As an example, as the components expand with operation at high temperature, the tip clearance can change.

As the tip clearance becomes large, a volume of air can pass through that clearance. This is undesirable and can reduce the efficiency of the engine.

Traditionally, a single turbine drove the fan rotor in a direct drive manner. More recently, a gear reduction has been included between a fan drive turbine and the fan. With the gear reduction, the fan rotor can become larger than in the prior art and the bypass ratio or volume of the air delivered into a bypass duct as propulsion air, compared to the amount of air delivered into the compressor can be increased. With this increase, the air being delivered into the compressor must be utilized more efficiently.

Thus, in so-called geared turbofan engines controlling the tip clearance becomes even more important.

SUMMARY

In a featured embodiment, a spool for a gas turbine engine has a compressor rotor, including a plurality of compressor blades each extending radially outwardly from the compressor rotor to an outer tip. A compressor housing surrounds each of the compressor blade tips, with the compressor housing having an inner surface, and a compressor tip clearance defined between each of the compressor blade tips and the inner surface of the compressor housing. A first actuator moves the compressor rotor and the compressor blades along a rotational axis of the compressor rotor. A turbine rotor includes a plurality of turbine blades each extending radially outwardly from the turbine rotor to an outer tip. A turbine housing surrounds each of the turbine blade tips. The turbine housing has an inner surface, and a turbine tip clearance defined between each of the turbine blade tips and the inner surface of the turbine housing. A second actuator moves the turbine rotor and the turbine blades along a rotational axis of the turbine rotor. A control controls the first actuator of the compressor rotor, and the second actuator of the turbine rotor to control the compressor tip clearance and the turbine tip clearance.

In another embodiment according to the previous embodiment, a central shaft slideably receives the compressor rotor and the turbine rotor, and is configured to rotate with the compressor rotor and the turbine rotor.

In another embodiment according to any of the previous embodiments, the compressor rotor and the turbine rotor are configured to slide on an anti-rotation interface on the central shaft.

In another embodiment according to any of the previous embodiments, a downstream end of the compressor rotor and an upstream end of the turbine rotor are spaced on the central shaft by a clearance such that both the compressor rotor and the turbine rotor may move relative to each other.

In another embodiment according to any of the previous embodiments, at least one sensor is configured to sense the compressor tip clearance and/or the turbine tip clearance and to communicate with the control.

In another embodiment according to any of the previous embodiments, a first compressor bearing is provided and utilized as the first actuator for the compressor rotor.

In another embodiment according to any of the previous embodiments, a first turbine bearing is provided and utilized as the second actuator for the turbine rotor.

In another embodiment according to any of the previous embodiments, a second compressor bearing is associated with the first compressor bearing for the compressor rotor.

In another embodiment according to any of the previous embodiments, a second turbine bearing is associated with the first turbine bearing for the turbine rotor.

In another embodiment according to any of the previous embodiments, a first turbine bearing is provided and utilized as the second actuator for the turbine rotor.

In another embodiment according to any of the previous embodiments, a second turbine bearing is associated with the first turbine bearing for the turbine rotor.

In another featured embodiment, a gas turbine engine has a compressor rotor, including a plurality of compressor blades each extending radially outwardly from the compressor rotor to an outer tip, and a compressor housing surrounding each of the compressor blade tips, with the compressor housing having an inner surface. A compressor tip clearance is defined between each of the compressor blade tips and the inner surface of the compressor housing. A first actuator moves the compressor rotor and the compressor blades along a rotational axis of the compressor rotor. A turbine rotor includes a plurality of turbine blades each extending radially outwardly from the turbine rotor to an outer tip, and a turbine housing surrounding each of the turbine blade tips. The turbine housing has an inner surface, and a turbine tip clearance defined between each of the turbine blade tips and the inner surface of the turbine housing. A second actuator moves the turbine rotor and the turbine blades along a rotational axis of the turbine rotor. A fan driven is by the turbine section through a gear reduction. A control controls the first actuator of the compressor rotor, and the second actuator of the turbine rotor to control the compressor tip clearance and the turbine tip clearance.

In another embodiment according to the previous embodiment, a central shaft slideably receives the compressor rotor and the turbine rotor, and is configured to rotate with the compressor rotor and the turbine rotor.

In another embodiment according to any of the previous embodiments, the compressor rotor and the turbine rotor are configured to slide on an anti-rotation interface on the central shaft.

In another embodiment according to any of the previous embodiments, a downstream end of the compressor rotor and an upstream end of the turbine rotor are spaced on the central shaft by a clearance such that both the compressor rotor and the turbine rotor may move relative to each other.

In another embodiment according to any of the previous embodiments, at least one sensor is configured to sense the compressor tip clearance and/or the turbine tip clearance and to communicate with the control.

In another embodiment according to any of the previous embodiments, a first compressor bearing is provided and utilized as the first actuator for the compressor rotor.

In another embodiment according to any of the previous embodiments, a first turbine bearing is provided and utilized as the second actuator for the turbine rotor.

In another embodiment according to any of the previous embodiments, a second compressor bearing is associated with the first compressor bearing for the compressor rotor.

In another embodiment according to any of the previous embodiments, a second turbine bearing is associated with the first turbine bearing for the turbine rotor.

In another embodiment according to any of the previous embodiments, a first turbine bearing is provided and utilized as the second actuator for the turbine rotor.

In another embodiment according to any of the previous embodiments, a second turbine bearing is associated with the first turbine bearing for the turbine rotor.

In another embodiment according to any of the previous embodiments,

These and other features may be best understood from the following drawings and specification.

DETAILED DESCRIPTION

Figure 1:
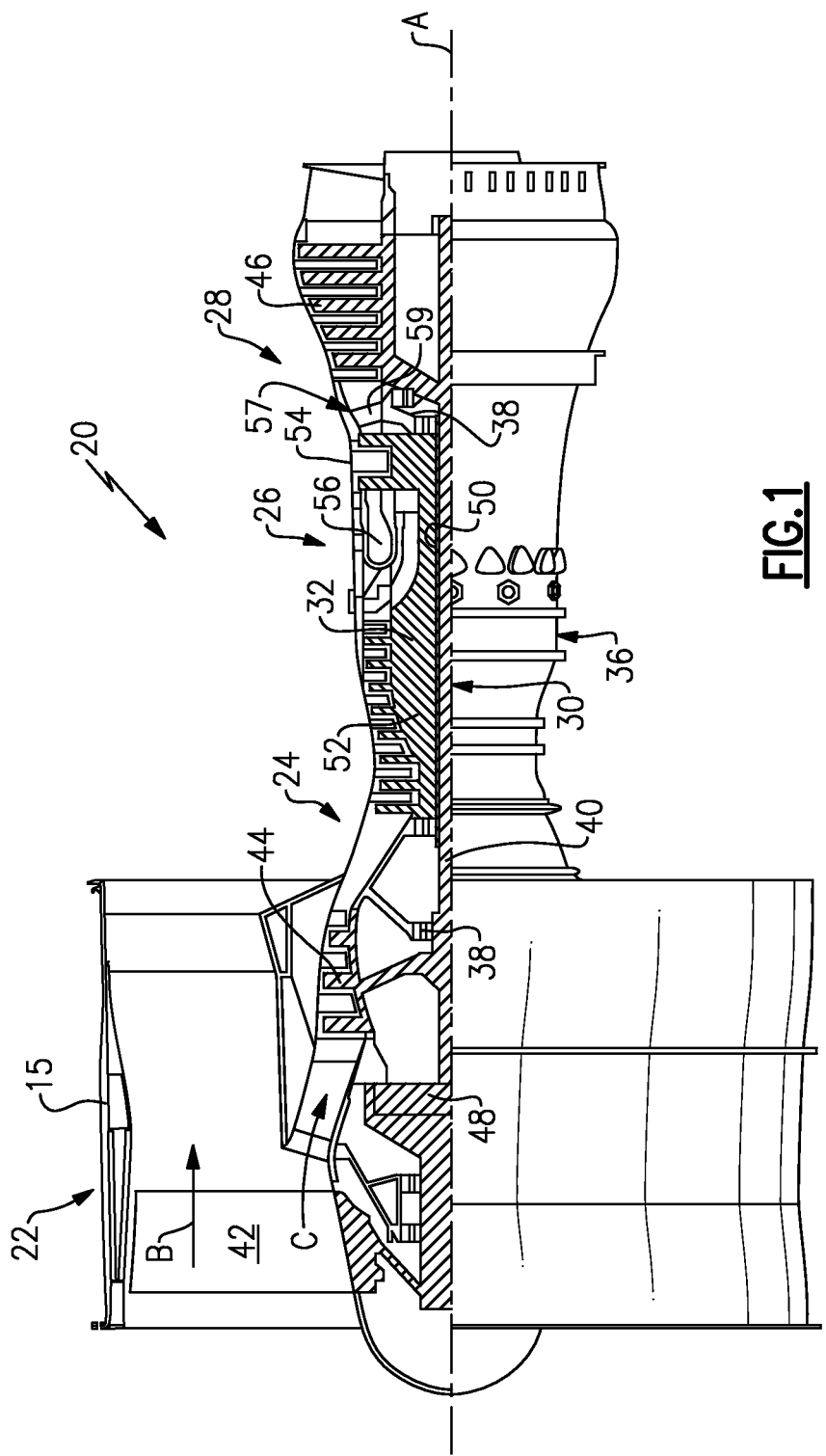
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{R})/(518.7 \text{ }° \text{R})]^{0.5}$. The "Low corrected fan tip speed" as disclosed herein according to one non-limiting embodiment is less than about 1150 ft/second.

Figure 2:
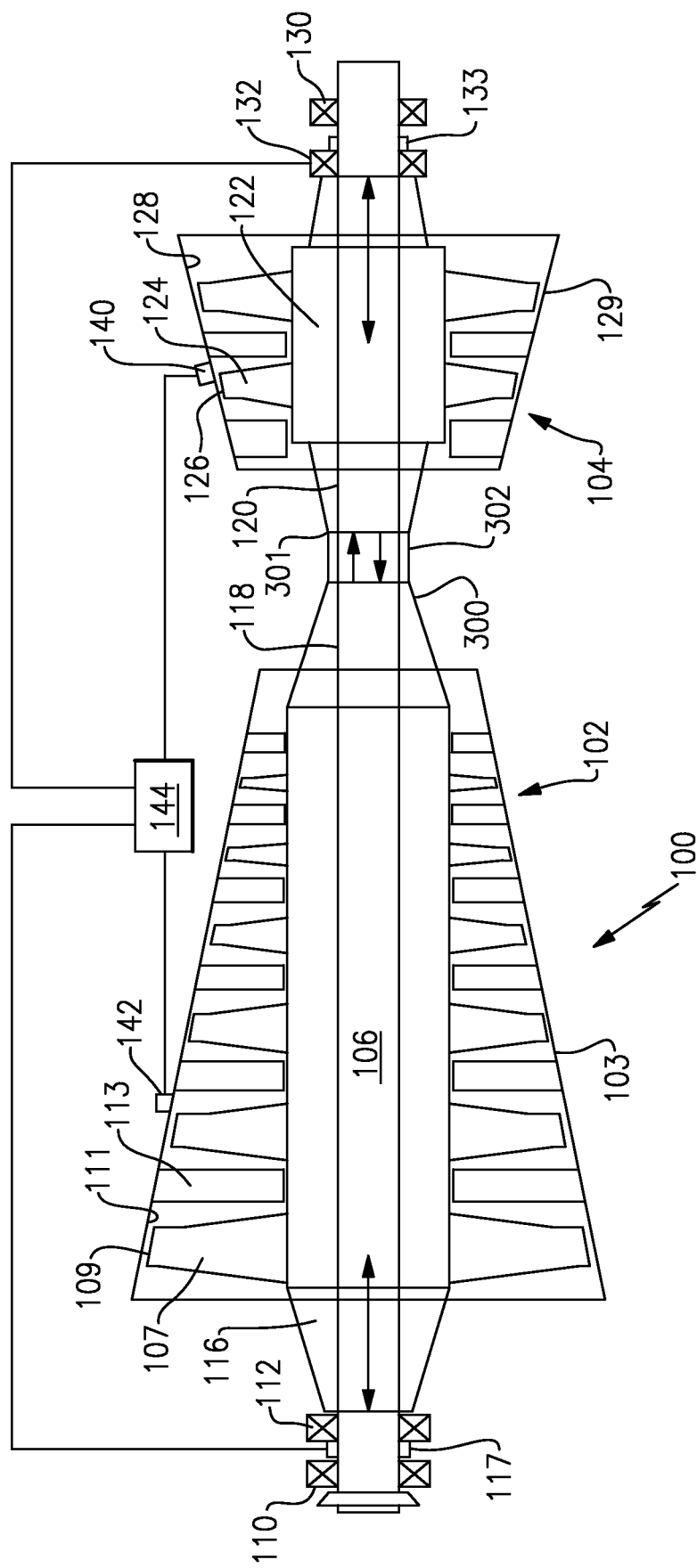
FIG. 2 shows a spool including a translating compressor and turbine rotor.

FIG. 2 schematically shows an engine 100 having a compressor 102 and a turbine rotor which respectively include a compressor rotor 116 and a turbine rotor 122. These may be the high pressure compressor and turbine rotors, such as illustrated in FIG. 1. Alternatively, this could also be the low pressure compressor and low pressure turbine of FIG. 1. Finally, an arrangement, such as shown in FIG. 2, could be utilized on both the high and low pressure spools.

As shown in FIG. 2, the compressor section 102 includes an outer housing 103, having an inner surface 111, which is closely spaced from an outer tip 109 of compressor blades 107. As can be appreciated, the inner size of the surface 111 and a diameter to the tip 109 both decrease in a downstream direction or to the right in FIG. 2. Further, these surfaces can be seen to be generally conical. In general, the term "generally conical" simply means that the size of an envelope of the outer tip 109 and 126 and the inner surface 111/128 of a housing 103/129 each decrease in their own direction in a generally linear fashion. The term should not be interpreted to require strict mathematical formula for the shape.

The compressor rotor 116 is in contact with a bearing 112 (such as a throw-out style bearing), which is driven by a drive member 117 (also referred to as an actuator). A second bearing 110 (such as a thrust bearing) is positioned outwardly of the drive member 117. This arrangement is all shown schematically. A throw-out bearing, such as 112, can serve to selectively move the rotor 116 to the right or to the left as shown in FIG. 2. With this axial movement, the position of the tip 109 relative to the surface 111 can change.

A sensor 142 senses a clearance between surface 111 and tip 109 and communicates that sensed clearance to a control 144. Should the clearance be greater than desired, then control 144 actuates actuator 117 of the bearing 112 to drive the rotor 116 to the right, such that the tip 109 approaches a smaller diameter portion of the inner surface 111 and the clearance is reduced.

Splines 118 on the rotor 116 are guided along a central shaft 106. The shaft 106 also supports the bearings 110 and 112.

At the opposed end of central shaft 106, the turbine 104 includes the rotor 122, which is also driven along its rotational axis by a bearing 132 (such as a throw-out style bearing) and actuator drive member 133 (also referred to as an actuator). Further, a second bearing 130 is included.

The turbine rotor 104 drives central shaft 106 to in turn drive the compressor rotor 116.

The movement of the turbine rotor 122 moves the blades 124 to control the location of a blade tip 126 relative to the inner surface 128 of a housing 129. Again, a sensor 140 communicates with control 144 and the control 144 communicates with the actuator 133 of the bearing 132.

As shown in FIG. 2, there is a clearance 302 between a downstream end 300 of the compressor rotor 116 and an upstream end 301 of the turbine rotor 122. While the clearance 302 is disclosed, other ways of allowing the relative movement, such as an overlap or slip joint interfaced between turbine rotor 104 and compressor rotor 116 may be utilized. The turbine rotor 122 moves along spline teeth 120 on the shaft 106. The clearance 302 allows the two rotors to both move toward each other, or away from each other.

While splines are disclosed, other anti-rotation interfaces could be used alternatively.

Should a detected tip clearance be greater than desired, the position of either rotor 116/122 or both rotors can be changed. Further, the control 144 may be programmed to receive information from a control for the associated engine, such that operating conditions of the engine can be relied upon to predict clearance. As an example, if the engine is moving into a high thrust condition, one can anticipate that the blade tips may grow and the clearance may become smaller. Should the blade tips grow, then the compressor rotor 116 may be moved upstream, or the left of FIG. 2, while the turbine rotor 122 may move downstream, or to the right as shown in FIG. 2. Other examples of predictions that could be included would be within the skill of a worker in the art.

The spline teeth 118, 120 with the shaft 106 may be lubricated.

While a throw-out bearing and actuator is disclosed as the way of translating the rotors 116/122, any number of other drive assemblies could be utilized. All that is required is a translation element which may translate the compressor rotor, and another translation element to translate the turbine rotor.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A gas turbine engine comprising:
a compressor rotor, including a plurality of compressor blades each extending radially outwardly from the compressor rotor to a compressor blade outer tip, and a compressor housing surrounding each of said compressor blade outer tips, with said compressor housing having an inner surface, and a compressor tip clearance defined between each of said compressor blade outer tips and said inner surface of said compressor housing, and a first actuator for moving said compressor rotor and said compressor blades along a rotational axis of said compressor rotor;
a turbine rotor including a plurality of turbine blades each extending radially outwardly from the turbine rotor to a turbine blade outer tip, and a turbine housing surrounding each of said turbine blade outer tips, with said turbine housing having an inner surface, and a turbine tip clearance defined between each of said turbine blade outer tips and said inner surface of said turbine housing, and a second actuator for moving said turbine rotor and said turbine blades along a rotational axis of said turbine rotor;
a fan driven by said turbine section through a gear reduction; and
a control for controlling said first actuator of said compressor rotor, and for controlling said second actuator of said turbine rotor to control the compressor tip clearance and the turbine tip clearance;
wherein a central shaft slideably receives said compressor rotor and said turbine rotor and is configured to rotate with said compressor rotor and said turbine rotor;

wherein said compressor rotor and said turbine rotor are configured to slide on an anti-rotation interface on said central shaft;

wherein a downstream end of said compressor rotor and an upstream end of said turbine rotor are spaced on said central shaft by a clearance such that both said compressor rotor and said turbine rotor may move relative to each other; and wherein at least one sensor is configured to sense the compressor tip clearance and/or the turbine tip clearance and to communicate with said control.

2. The gas turbine engine as set forth in claim 1, wherein a first compressor bearing is provided and utilized as the first actuator for the compressor rotor.

3. The gas turbine engine as set forth in claim 1, wherein a first turbine bearing is provided and utilized as the second actuator for the turbine rotor.

4. The gas turbine engine as set forth in claim 2, wherein a second compressor bearing is associated with the first compressor bearing for the compressor rotor.

5. The gas turbine engine as set forth in claim 3, wherein a second turbine bearing is associated with said first turbine bearing for the turbine rotor.

6. The gas turbine engine as set forth in claim 4, wherein a first turbine bearing is provided and utilized as the second actuator for the turbine rotor.

7. The gas turbine engine as set forth in claim 6, wherein a second turbine bearing is associated with said first turbine bearing for the turbine rotor.

\* \* \* \* \*